June 16, 1953 W. R. BAKER 2,642,531

RADIO-FREQUENCY OSCILLATOR

Filed Aug. 29, 1950

INVENTOR.
WILLIAM R. BAKER
BY Roland A. Anderson
ATTORNEY.

Patented June 16, 1953

2,642,531

UNITED STATES PATENT OFFICE 2,642,531

RADIO-FREQUENCY OSCILLATOR

William R. Baker, Berkeley, Calif., assignor to the United States of America as represented by the United States Atomic Energy Commission Application August 29, 1950, Serial No. 182,101

6 Claims. (Cl. 250—36)

This invention relates to a radio-frequency oscillator and more particularly to radio-frequency oscillator for a cyclotron.

The increasing search for apparatus and methods for accelerating charged particles to increasingly higher energies has led to the combination of known types of accelerators. With such a combination of accelerators a cyclotron may be used to initially accelerate charged particles to a desired energy level for injection into another type accelerator, such as a synchrotron, which then accelerates the particles to much higher energy levels. For best operation of such a system it is desirable that the cyclotron injector operate with a high degree of stability. To accomplish this latter feature it is necessary to provide a radio-frequency oscillator for the cyclotron injector which is free from parasitic oscillations.

The present invention utilizes the load capacity and the coupling capacity within the oscillator circuit to provide a voltage divider, having a low-impedance driving characteristic for the grid of the oscillator tube. Also the grounded side of the filament of the oscillator tube contains a choke to isolate the radio-frequency system from ground. The result of the low-impedance capacitive drive and the floating construction is an oscillator substantially free of parasitic oscillations.

It is therefore an object of the present invention to provide a new and improved radio-frequency oscillator.

Another object of the invention is to provide a radio-frequency oscillator that is free from parasitic oscillations.

A further object of the invention is to provide a radio-frequency oscillator which utilizes the capacity of the load and the coupling capacity of the oscillator to form a low-impedance capacitive voltage drive.

A still further object of the invention is to provide a radio-frequency oscillator wherein the inductance of the output conductors and the capacity of the load form a resonant tank circuit.

Other objects and advantages of the present invention will be apparent from the following description and claims considered together with the accompanying drawing in which:

Figure 1:
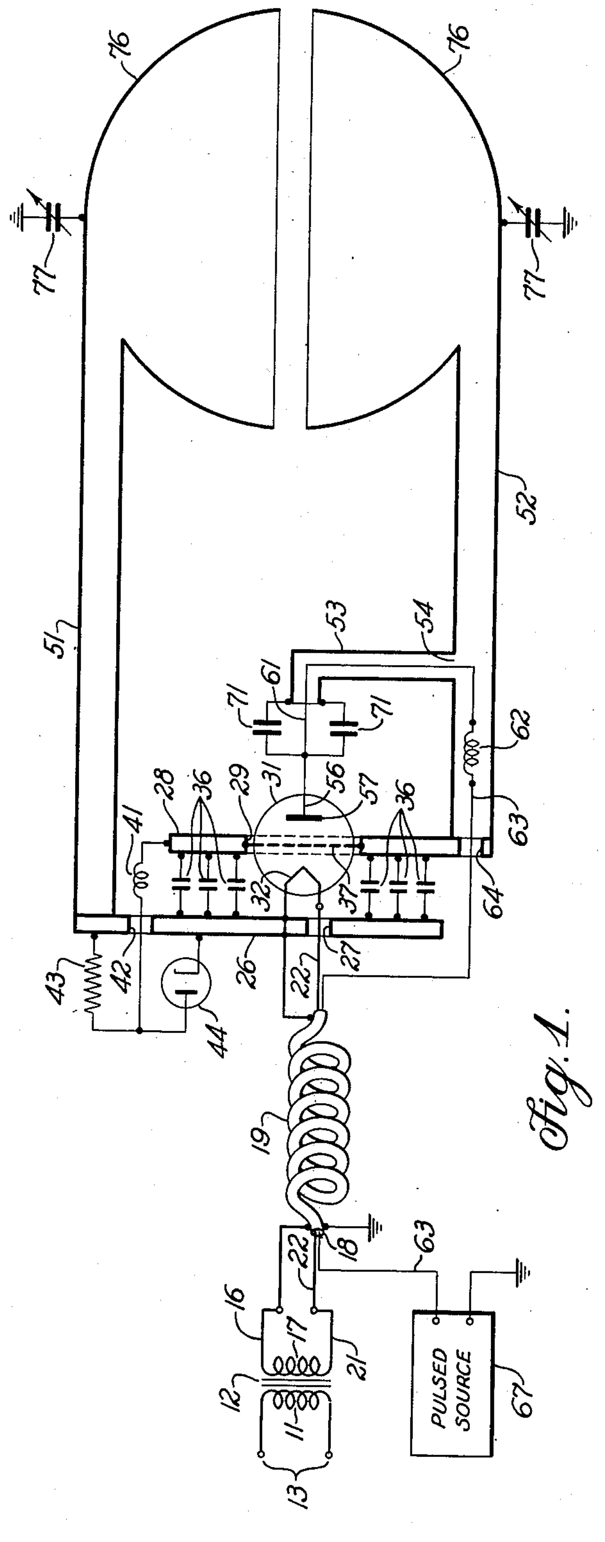
Figure 1 is a schematic wiring diagram of the invention.

Considering the drawing in detail, and Fig. 1 in particular, the primary winding 11 of a conventional filament transformer 12 is connected across a source 13 of low frequency, 60 cycle, alternating voltage. One side 16 of the secondary winding of the transformer 12 is connected to the grounded end 18 of an isolating choke 19 and the other side 21 is connected to an insulated lead 22 which is threaded through the tubular choke 19 from the grounded end 18. A plate 26 of copper or similar conducting material, having an aperture 27 is preferably positioned perpendicular to the axis of the choke 19 with the lead 22 projecting from the tubular choke through the aperture 27. Disposed parallel to the plate 26 is a second plate 28, similar to the plate 26, which has an opening 29. A triode tube 31 is disposed within the opening 29 and is supported therein, in any suitable manner, with the leads of the filament 32 projecting toward the plate 26 and the aperture 27 therein. To supply operating voltages to the filament 32 of the tube 31 one of the filament leads is connected to the lead 22 and the other is electrically joined to the plate 26 which, in turn, is directly connected to the choke 19. A plurality of capacitors 36 are connected between the two plates 26 and 28 to form a path for radio-frequency current. The capacitors 36 are preferably adapted to plug into receptacles (not shown) located on the perimeters of the plates 26 and 28 so that the amount of capacity therebetween may be readily varied by the number of such capacitors used. The need for this latter feature will be more fully set forth hereinafter.

A connection is made from the grid 37 of the tube 31 to the plate 28; thereby placing the capacity of the capacitors 36 in parallel with the path between the filament 32 and the grid 37 of the tube 31. Also connected to the plate 28 is one end of a grid choke 41, the other end being extended through a second aperture 42 in the plate 26 and connected to a parallel circuit comprising a grid resistor 43 and a surge limiting diode 44. To complete the connection of the parallel circuit both of the elements thereof are connected to the plate 26.

Abutting perpendicularly against the plate 26 at a marginal portion thereof is an elongated tubular conductor 51. A second elongated tubular conductor 52 abuts against the plate 28 and extends parallel to the conductor 51. Preferably the conductors 51 and 52 are of a material such as copper and are soldered to the plates 26 and 28, respectively. Another tubular conductor 53 is soldered to the innermost surface of the conductor 52 about a communicating aperture 54. The conductor 53 is formed with an inwardly extended ninety-degree bend and is dimensioned so that the open end thereof is aligned with and adjacent to the anode lead 56 of the tube 31.

To furnish an operating voltage to the anode 57 of the tube 31, the anode lead 56 is joined to an insulated conductor 61 which is threaded through the conductor 53, through the aperture 54, and thence into the central opening of the conductor 52 where a connection is made to one end of a radio-frequency choke 62. The other end of the choke 62 is connected to another insulated conductor 63 threaded through an aperture 64 in the plate 28 and thence through the choke 19, along with the lead 22, to an external source of pulsed power 67. To prevent the pulsed power from appearing in the output circuit a plurality of capacitors 71 are connected between the anode lead 56 of the tube 31 and the conductor 53.

The output of the oscillator circuit, described in the foregoing, is taken from the conductors 51 and 52. In the embodiment of the invention illustrated in Fig. 1 of the drawing, the load comprises a pair of dee structures 76, one of which is connected, as by soldering, to the conductor 51 and the other to the conductor 52. To vary the capacity of the dee structures 76, a variable capacitor 77 may be connected between each of the dees and ground. It will be readily apparent that such a load, as the dee structures 76, is merely illustrative and that other types of radio-frequency loads may be driven by the oscillator circuit described.

Consider now the operation of the invention with the source 13 energized and the pulsed source 67 delivering pulses of voltage at a desired repetition rate. It is to be noted that one side of the filament of the tube 31 is connected to ground through the radio-frequency choke 19 which is a low impedance to low frequency voltages, but a high impedance to radio-frequency voltages. Therefore, since the entire oscillator circuit is free of any direct ground connections for radio-frequency voltages, the choke 19 serves to isolate the circuit from ground, but allows proper heating of the filament 32 by the low frequency current from the transformer 12.

The capacitors 36, connected between the plates 26 and 28, are chosen to have such values at the oscillating radio-frequencies that an effective connection exists between the conductors 51 and 52 and at the same time form a part of a capacitive voltage divider with the capacity of the dee structures 76 and the capacitors 77. Reference is now made to the equivalent circuit of Fig. 2 of the drawing wherein the capacitors 36 are represented as a capacitor 101 and the capacity of the dee structures 76 with that of the capacitors 77 is represented as a capacitor 102. The inductance of the conductor 51 is represented as a coil 103 and that of the conductor 52 as a coil 104. It will be noted that the above-described circuit elements form a resonant tank circuit. The remaining portion of the equivalent circuit is connected in the manner previously described and the elements thereof are indicated by the same reference numerals as appear in Fig. 1.

Figure 2:
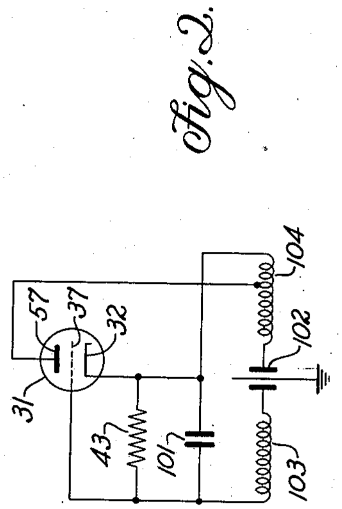
Figure 2 is an equivalent circuit of the invention as shown in Fig. 1.

Further reference to the equivalent circuit of Fig. 2 reveals that the capacitor 101 is connected between the filament 32 and grid 37 of the tube 31 and thereby forms a low-inductance capacitive drive for the tube. Also, the construction of the conductors 52 and 53 (Fig. 1) forms the necessary anode coupling loop for oscillation of the circuit, as shown by the tap on the coil 104 in Fig. 2.

From the foregoing it will be readily apparent that during the time that a positive pulse of voltage is impressed at the anode of the tube 31, oscillations will be set up at the resonant frequency of the tank circuit. The driving voltage of the tube 31 can be easily adjusted by varying the capacity of the capacitors 36 while the resonant frequency of the tank circuit can be varied by altering the capacity of the load by means of the capacitors 77.

As discussed previously the choke 19 isolates the oscillatory circuit from ground thereby affording a floating construction. The choke 62 prevents radio-frequency grid voltage from appearing at the anode of the tube 31. The diode 44 prevents the grid from going positive thereby eliminating the flow of grid current and the attendant blocking in the tube due to secondary emission at the grid.

The foregoing features result in an oscillator circuit which has a floating construction and a low-impedance capacitive drive to supply a radio-frequency voltage which is free from parasitic oscillations.

To supply a radio-frequency voltage to a cyclotron dee structure having an approximate capacity of 140 mmf. for each dee, the oscillator was pulsed to provide a peak pulse power of 100 kilowatts at 100 kilovolts. By varying the capacity of the dees from 140 mmf. to 300 mmf. it was possible to tune the oscillator between 8 and 12 megacycles. Under these conditions the frequency of the oscillator was extremely stable with no tendency to lock-in at other than the desired frequency.

While the salient features of the invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a radio-frequency oscillator, the combination comprising a vacuum tube having at least a filament, grid, and anode, said grid and filament having a parallel connected resistor and capacitor connected therebetween, a series connected first inductance and first capacitance connected between said grid and a neutral point, a series connected second inductance and second capacitance connected between said filament and said neutral point, said anode being connected to an intermediate tap on said second inductance, means connected to said filament for rendering said electron emissive, and means connected to said anode for rendering said tube conductive.

2. In a radio-frequency oscillator, the combination comprising a vacuum tube having at least a filament, grid, and anode, said grid and filament having a parallel connected resistor and capacitor connected therebetween, a first series resonant circuit connected between said grid and a neutral point, a second series resonant circuit connected between said filament and said neutral point, said anode being connected to said second resonant circuit for providing coupling therebetween, means connected to said filament for rendering said filament electron emissive, and means connected to said anode for rendering said tube conductive.

3. In a radio-frequency oscillator, the combination comprising a vacuum tube having at least a filament, grid, and anode, said grid and filament having a parallel connected resistor and capacitor connected therebetween, a series connected first inductance and first capacitance connected between said grid and a neutral point, a series connected second inductance and second capacitance connected between said filament and said neutral point, said anode being connected to an intermediate tap on said second inductance, a source of low frequency current, a high frequency choke connected between one side of said filament and source, the other side of said filament being directly connected to the other side of said source, and means connected to said anode for supplying an operating voltage to said tube.

4. In a radio-frequency oscillator, the combination comprising a vacuum tube having at least a filament, grid, and anode, a first and second tubular conductor, said first conductor being connected at one end to said filament, said second conductor being connected at one end to said grid, a radio-frequency load connected to the other ends of said conductors, a plurality of capacitors connected between said grid and said filament, a resistor connected in parallel with said capacitors, a radio-frequency choke connected between one side of said filament and ground, a source of low frequency power connected between the other side of said filament and ground, a radio-frequency coupling means connected between said anode and an intermediate point on said second conductor, and means connected to said anode for supplying an operating voltage thereto.

5. In a radio-frequency oscillator, the combination comprising a vacuum tube having at least a filament, grid, and anode, a first and second tubular conductor, said first conductor being connected at one end to said filament, said second conductor being connected at one end to said grid, a radio-frequency load connected to the other ends of said conductors, a plurality of capacitors connected between said grid and said filament, a resistor connected in parallel with said capacitors, a radio-frequency choke connected between one side of said filament and ground, a source of low frequency power connected between the other side of said filament and ground, a third tubular conductor joined intermediately to said second conductor and projected angularly toward said anode, means coupling said third conductor to said anode, and means connected to said anode for supplying an operating voltage thereto.

6. In a radio-frequency oscillator, the combination comprising a first plate of conducting material, a second plate of conducting material disposed parallel to said first plate, a plurality of capacitors and a resistor connected in parallel between said plates, a vacuum tube having at least a filament, grid, and anode, said tube being disposed centrally within an aperture in said second plate, said filament being connected to said first plate, said grid being connected to said second plate, a radio-frequency load, a first tubular conductor disposed between said first plate and said load and electrically connected to both, a second tubular conductor disposed parallel to said first conductor between said second plate and said load and electrically connected to both, a tubular radio-frequency choke connected at one end to said first plate at the other end to ground, a source of low frequency power connected between said filament and ground, a source of operating voltage connected to said anode by a lead extended through said choke, through a communicating aperture in said first plate to said second conductor, through said second conductor to said third conductor and thence to said anode, and a plurality of capacitors connected between said anode and the end of said third conductor.

WILLIAM R. BAKER.

References Cited in the file of this patent

UNITED STATES PATENTS

| Number | Name | Date |
|---|---|---|
| 1,948,384 | Lawrence | Feb. 20, 1934 |
| 2,077,800 | Kroger | Apr. 20, 1937 |
| 2,265,113 | Dick | Dec. 2, 1941 |
| 2,333,295 | Chevigny | Nov. 2, 1943 |
| 2,467,736 | George | Apr. 19, 1949 |
| 2,484,229 | Jackson | Oct. 11, 1949 |
| 2,492,324 | Salisbury | Dec. 27, 1949 |
| 2,505,022 | Wheeler | Apr. 25, 1950 |
| 2,545,623 | MacKenzie | Mar. 20, 1951 |